(12) United States Patent
Binkert et al.

(10) Patent No.: US 8,342,460 B2
(45) Date of Patent: Jan. 1, 2013

(54) DEVICE FOR FASTENING A CONNECTOR PIECE TO A CARRIER PIECE AND FASTENING ARRANGEMENT HAVING SUCH A DEVICE

(75) Inventors: Sven Binkert, Albbruck (DE); Uwe Motsch, Rheinfelden (DE)

(73) Assignee: A. Raymond et Cie, Grenoble (FR)

( * ) Notice: Subject to any disclaimer, the term of this patent is extended or adjusted under 35 U.S.C. 154(b) by 218 days.

(21) Appl. No.: 12/740,703

(22) PCT Filed: Oct. 2, 2008

(86) PCT No.: PCT/EP2008/008354
§ 371 (c)(1),
(2), (4) Date: Jul. 13, 2010

(87) PCT Pub. No.: WO2009/059668
PCT Pub. Date: May 14, 2009

(65) Prior Publication Data
US 2012/0085874 A1    Apr. 12, 2012

(30) Foreign Application Priority Data
Nov. 8, 2007  (DE) .......................... 10 2007 053 291

(51) Int. Cl.
*F16B 15/00* (2006.01)
(52) U.S. Cl. .......... 248/71; 248/73; 248/74.3; 248/74.5; 24/295
(58) Field of Classification Search ............ 248/62, 248/71, 73, 74.1, 74.3, 74.5; 24/293, 295 X, 24/297, 453; 280/728.2, 730.2; 411/508
See application file for complete search history.

(56) References Cited

U.S. PATENT DOCUMENTS

| | | | |
|---|---|---|---|
| 4,920,618 A * | 5/1990 | Iguchi | 24/453 |
| 5,507,610 A | 4/1996 | Benedetti et al. | |
| 2005/0086773 A1* | 4/2005 | Kuhnle et al. | 24/297 |
| 2006/0066080 A1 | 3/2006 | Ikeda et al. | |
| 2008/0193250 A1 | 8/2008 | Boubtane | |

FOREIGN PATENT DOCUMENTS

| | | | |
|---|---|---|---|
| EP | 1081395 A1 | | 7/2001 |
| EP | 1422112 A1 | * | 5/2004 |
| EP | 1422112 A1 | | 5/2004 |
| EP | 1571353 A2 | | 9/2005 |
| FR | 2882114 A1 | | 8/2006 |
| JP | 2006007933 | * | 1/2009 |
| JP | 2009074635 | * | 4/2009 |

OTHER PUBLICATIONS

International Search Report and Written Opinion mailed Jan. 26, 2009 in parent application No. PCT/EP2008/008354.

* cited by examiner

*Primary Examiner* — Gwendolyn W. Baxter
(74) *Attorney, Agent, or Firm* — Faegre Baker Daniels

(57) ABSTRACT

A bracket part and a securing part are provided to connect an add-on part to a carrier part. The securing part is displaceable relative to the bracket part. The bracket part includes a carrier part receptacle that receives an edge region of the carrier part that is adjacent a carrier-part opening. In a final mounting arrangement, the securing part secures the bracket part via a mounting operation that can be performed by displacing the bracket part and the securing part. The final mounting arrangement can be easily checked for proper execution.

11 Claims, 6 Drawing Sheets

DEVICE FOR FASTENING A CONNECTOR PIECE TO A CARRIER PIECE AND FASTENING ARRANGEMENT HAVING SUCH A DEVICE

CROSS-REFERENCE TO RELATED APPLICATION

This application is a U.S. National Phase Patent Application based on International Application Serial No. PCT/EP2008/008354 filed Oct. 2, 2008, the disclosure of which is hereby explicitly incorporated by reference herein.

BACKGROUND OF THE INVENTION

1. Field of the Invention

The present invention relates to a device for fastening an add-on part to a carrier part.

The invention is further directed to a fastening arrangement comprising a device for fastening an add-on part to a carrier part.

2. Description of the Related Art

Fastening devices are known, for example, in the form of cage nuts that cooperate with threaded fasteners and are anchored in the carrier part, or in the form of so-called clips that are pushed through the add-on part and are snapped together with the carrier part. However, these arrangements have the disadvantages—depending on the particular embodiment—of requiring relatively great manual effort during the connecting operation and/or affording a relatively low pull-out force in comparison to normal requirements. In addition, it is not always easy to check the proper execution of the mounting operation.

SUMMARY OF THE INVENTION

The present invention provides a device for fastening an add-on part to a carrier part and a fastening arrangement having such a device, which are distinguished by a relatively high pull-out force and yet can be mounted in a relatively simple operation that is easy to check for proper execution.

This object is achieved according to the invention by means of a device for fastening an add-on part to a carrier part, and by means of a fastening arrangement having such a device.

In the device according to the invention, the ability of the bracket part to be slid onto the edge region of the carrier-part opening provided in the carrier part results in a very intimate form lock between the bracket part and the carrier part, thus making for a very high pull-out force. Because the securing pin that is configured on the securing part, which latter is displaceable relative to the bracket part, is disposed in the carrier-part opening when the carrier part is inserted in the carrier part receptacle, accidental displacement of the bracket part out of the form lock is blocked; and, moreover, the ability to clearly see that the securing part is securing the bracket part when the securing part is in the pushed-in arrangement makes it very easy to check the proper execution of the mounting operation.

Furthermore, in the case of the fastening arrangement according to the invention, particularly mounting-friendly prefabrication is realized by connecting the inventive device to the add-on part.

In one form thereof, the present invention provides a device for fastening an add-on part to a carrier part, including a bracket part, which is insert able in a carrier-part opening formed in the carrier part and has a carrier part receptacle for receiving an edge region of the carrier part adjacent the carrier-part opening and is adapted to fasten the carrier part to the add-on part; and further including a securing part, which is connected to the bracket part and is displaceable in relation to the bracket part and includes a securing pin which, in the arrangement wherein the carrier part is inserted in the carrier part receptacle, is disposed in the carrier-part opening, thereby affixing the bracket part to the carrier part.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
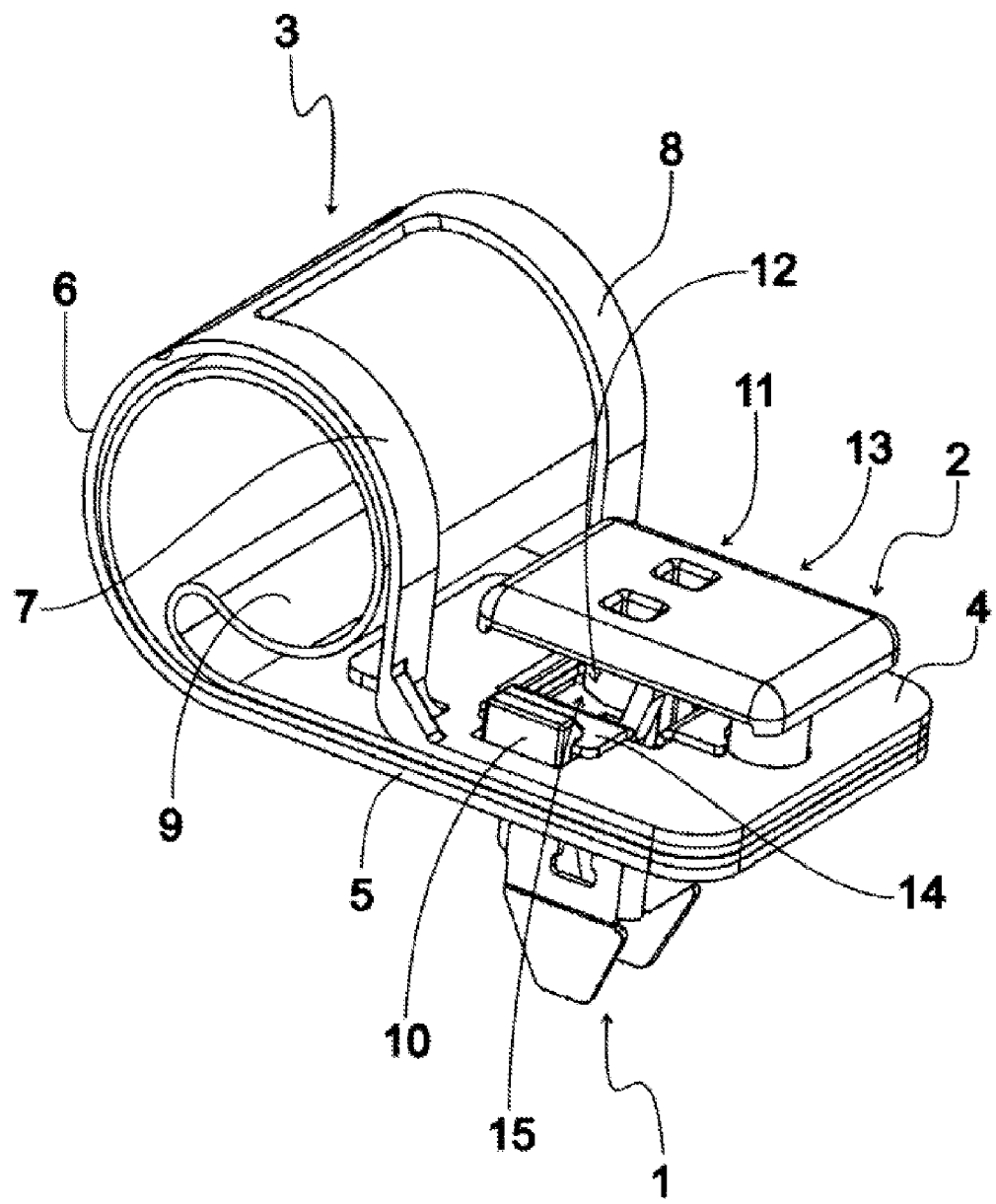
FIG. 1 is a perspective view of an exemplary embodiment of a fastening arrangement according to the invention, comprising an add-on part and a device according to the invention for fastening an add-on part to a carrier part, which device is provided with a bracket part connected to the add-on part and with a securing part, in a raised pre-mounting position.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a fastening arrangement according to the invention, comprising a device according to the invention that is provided with a bracket part 1, which is configured as a stamped and bent part made from a strip of sheet metal, and a securing part 2 made from a hard-elastic plastic material. The fastening arrangement depicted in FIG. 1 also comprises, as an add-on part, an airbag receptacle 3, which, by a planar top portion 4 and a planar bottom portion 5 arranged in spaced relation to and parallel to top portion 4, is disposed between bracket part 1 and securing part 2. Between top portion 4 and bottom portion 5, the airbag receptacle 3 has a receiving portion 6 formed in the manner of a hollow cylinder, which is provided on its side 2 facing toward top portion 4 with marginally disposed connecting strips 7, 8 that are joined to top portion 4. It can also be discerned from FIG. 1 that the airbag receptacle 3 encases an airbag 9, which is made of a flexible, highly tear-resistant fabric and is disposed by end portions between top portion 4 and bottom portion 5.

Configured as a latching assembly on airbag receptacle 3 are tab catch noses 10, 11, which are disposed one on each side in a first bracket receiving opening 12 formed in top portion 4, and which, in the pre-mounting position of the inventive fastening arrangement as depicted in FIG. 1, engage behind laterally outwardly protruding side tabs 13, 14 configured on bracket part 1, while bracket part 1 also extends through a second bracket receiving opening 15, formed in bottom portion 5, and thereby also passes into the through-openings provided in the portions of airbag 9 that are situated between top portion 4 and bottom portion 5.

Figure 2:
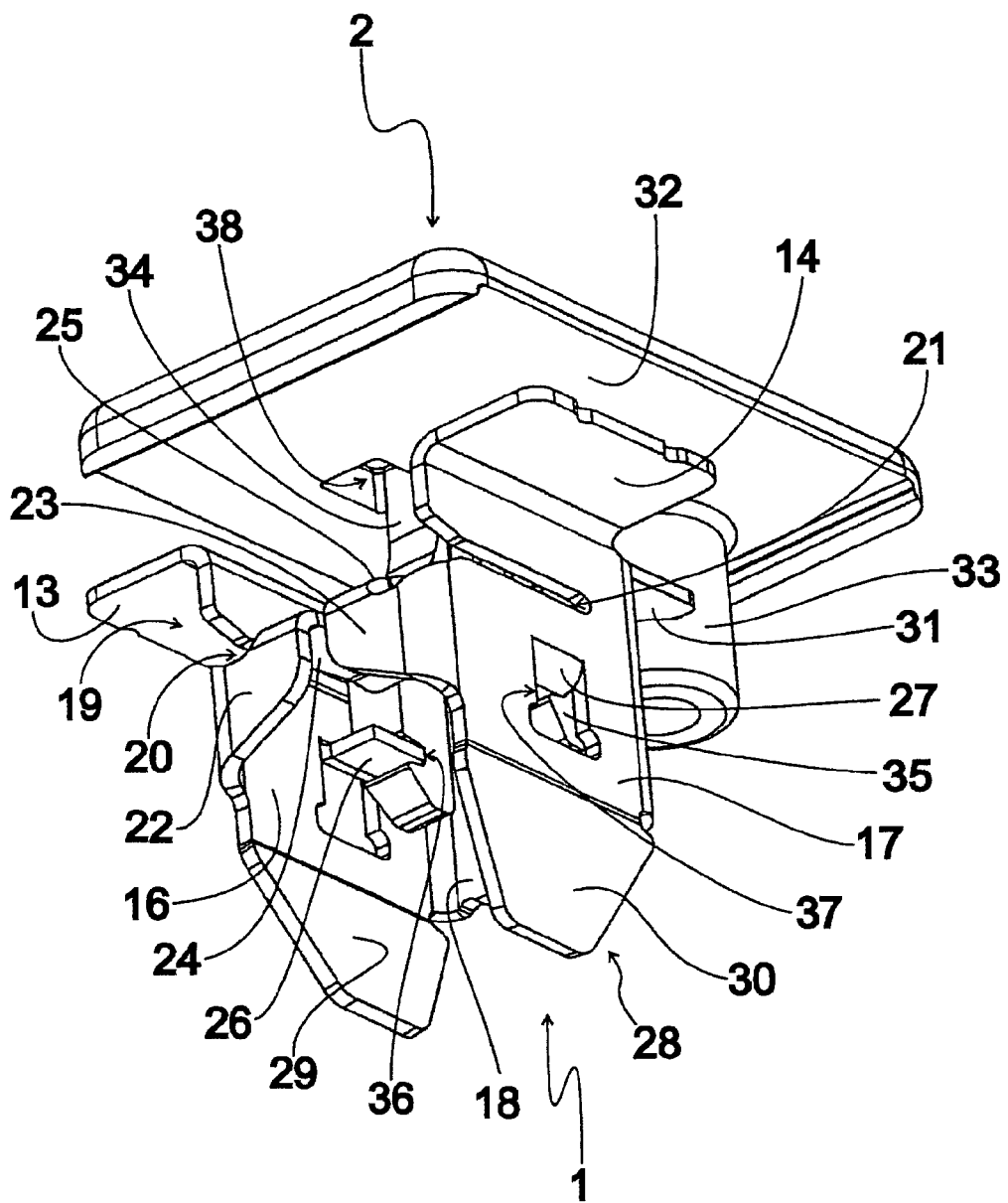
FIG. 2 shows the exemplary embodiment of the device according to the invention as depicted in FIG. 1, in the pre-mounting position, looking toward a locking arm of the securing part that is in engagement with a locking tongue configured on the bracket part.

FIG. 2 is a perspective view of the exemplary embodiment of a device comprising a bracket part 1 and a securing part 2. It is apparent from FIG. 2 that bracket part 1 has a first side wall 16 and a second side wall 17, which are oriented parallel to each other and are connected to each other by a back wall 18, to which they are each oriented at right angles. The side tabs 13, 14 are each formed on a respective side wall 16, 17, in a head region 19 of the bracket part 1. A respective receiving slot 20, 21 of a carrier part receptacle is provided in each side wall 16, 17 in spaced relation to the side tabs 13, 14 and extends, spaced apart from back wall 18, away there from, widening in a funnel-like manner at its open, debouching end, i.e., the end remote from back wall 18.

On the opposite side of each receiving slot 20, 21 from the respective side tab 13, 14, each side wall 16, 17 has an end portion 22, 23, which extends toward the respective opposite side wall 16, 17 and on each of which is formed a respective spring leg 24, 25, which is disposed between the side walls 16, 17 and extends toward the back wall 18 and is oriented with an inclination that rises, at an angle to the side tabs 13, 14, from the respective end portion 22, 23 toward the back wall 18. The free ends of the spring legs 24, 25 thus are disposed, in the longitudinal direction of bracket part 1, between the receiving slots 20, 21 and the side tabs 13, 14. As can be seen from FIG. 3, each spring leg 24, 25 is angled toward the foot region 28 at its free end remote from the respective end portion 22, 23.

Each side wall 16, 17 comprises a locking tongue 26, 27, formed by punching, which is disposed between the head region 19, on the side of the particular receiving slot 20, 21 that faces away from the respective side tab 13, 14, and a foot region 28 of bracket part 1 that is disposed oppositely from the head region 19. Each locking tongue 26, 27 extends from the particular side wall 16, 17 on which it is formed toward the opposite side wall 16, 17, and is oriented at right angles to the side walls 16, 17.

If can further be appreciated from the representation of FIG. 1 that each side wall 16, 17 has, in foot region 28, an inwardly canted introducing tongue 29, 30 that tapers away from the head region 19.

Finally, bracket part 1 comprises an abutment tab 31, which is formed onto back wall 18 in head region 19 and extends outward away from back wall 18 at right angles thereto.

Securing part 2 is configured with a flat top plate 32, on the side of which that faces away from bracket part 1 is formed a hollow-cylinder-like securing pin 33. In the pre-mounting arrangement depicted in FIG. 2, securing pin 33 bears against abutment tab 31, the free end of which is shaped to conform to the outer contour of securing pin 33.

Also formed on top plate 32 are a first locking arm 34 and a second locking arm 35, which also extend toward bracket part 1 and are disposed between the side walls 16, 17, each near a respective side wall 16, 17. Each of the locking arms 34, 35, which are configured to be resiliently elastic, has at its free end remote from top plate 32 a respective locking-tongue groove 36, 37, in which, in the raised pre-mounting position of securing part 2 depicted in FIG. 2, the locking tongue 26, 27 nearest the respective locking arm 34, 35 is disposed, thus blocking the securing part 2 against displacement toward bracket part 1. It can also be discerned from FIG. 2 that provided in top plate 32, in the connection region of each locking arm 34, 35, on the side facing toward the respective locking-tongue groove 36, 37, is a release opening 38 (only one of two such release openings is visible in FIG. 2) through which a tool can be inserted to act on the locking arms 34, 35.

Figure 3:
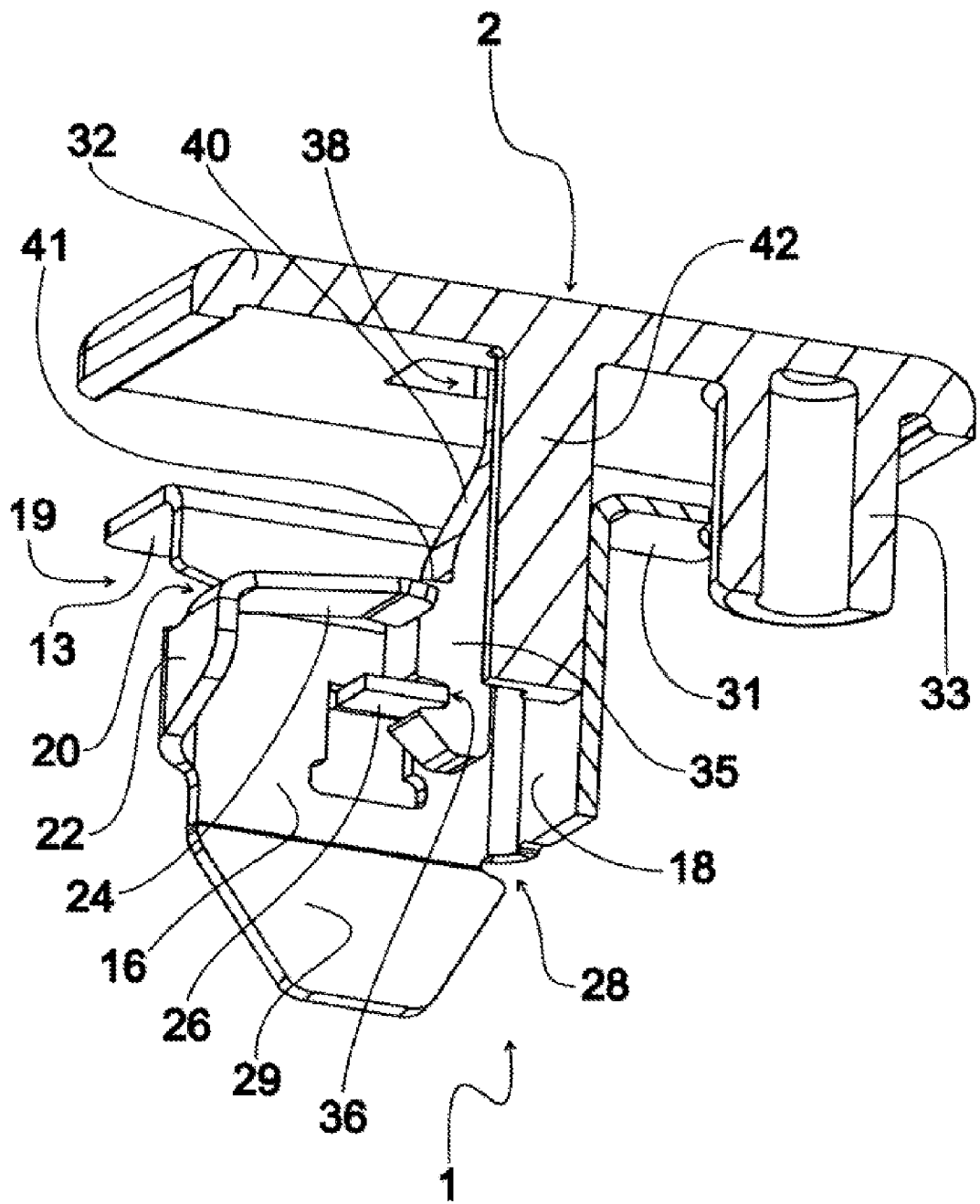
FIG. 3 is a cut-away perspective view of the exemplary embodiment of a device according to the invention as depicted in FIGS. 1 and 2, looking toward the spring arm of the securing part and toward a spring leg configured on the bracket part.

FIG. 3 is a perspective cut-away view of the exemplary embodiment of a device according to the invention as depicted in FIGS. 1 and 2, in the pre-mounting position shown in FIG. 2. From the illustration of FIG. 3 it can be seen that the abutment tab 31 lies in the plane of the side tabs 13, 14. It may also be observed in FIG. 3 that each locking arm 34, 35 is configured with a releasing ramp 40 that extends away from top plate 32, from an edge face of the particular release opening 38 in prolongation of said release opening 38 and into the area capped in the longitudinal direction by said release opening 38 such that a tool inserted into the release openings 38 at right angles to top plate 32 necessarily comes into contact with the releasing ramps 40. At the end of each releasing ramp 40 remote from top plate 32, each locking arm 34, 35 has a rear engagement step 41 that is disposed ahead of the respective locking-tongue groove 36, 37, "rear engagement" being understood in the longitudinal direction of said locking arm 34, 35.

It can also be seen from FIG. 3 that securing part 1 includes a central pin 42, which is disposed between the locking arms 34, 35 and extends at right angles away from top plate 32, and which, for guiding purposes, bears against the back wall 18 of bracket part 1.

Figure 4:
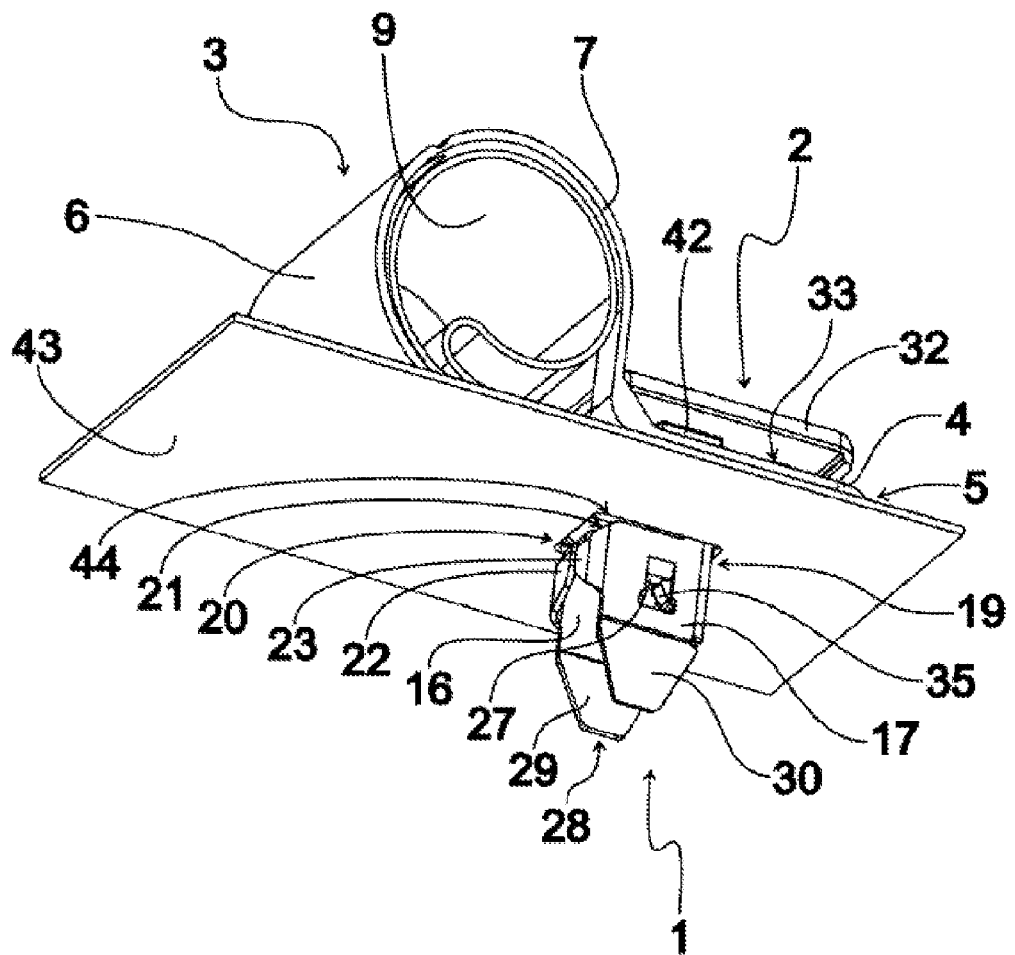
FIG. 4 is a perspective view of a carrier part configured with a carrier-part opening into which the bracket part of the exemplary embodiment depicted in FIGS. 1 to 3 is inserted.

FIG. 4 is a perspective view of the exemplary inventive fastening arrangement depicted in FIG. 1 and of the exemplary inventive device depicted in FIGS. 1 to 3, in an arrangement in which said device is inserted in a carrier-part opening 44 provided in a carrier part 43, here in the form of a flat body sheet of a motor vehicle. The carrier-part opening 44 is shaped to conform, with relatively little over sizing, to the outer contour of bracket part 1. It can be discerned from FIG. 4 that the distance in the longitudinal direction between the receiving slots 20, 21 and the bottom portion 5 of the airbag receptacle 3 is calculated to correspond to the thickness of the carrier part 43. In the arrangement of FIG. 4, securing part 2 is in a pre-mounting position, in which it is raised with respect to bracket part 1.

Figure 5:
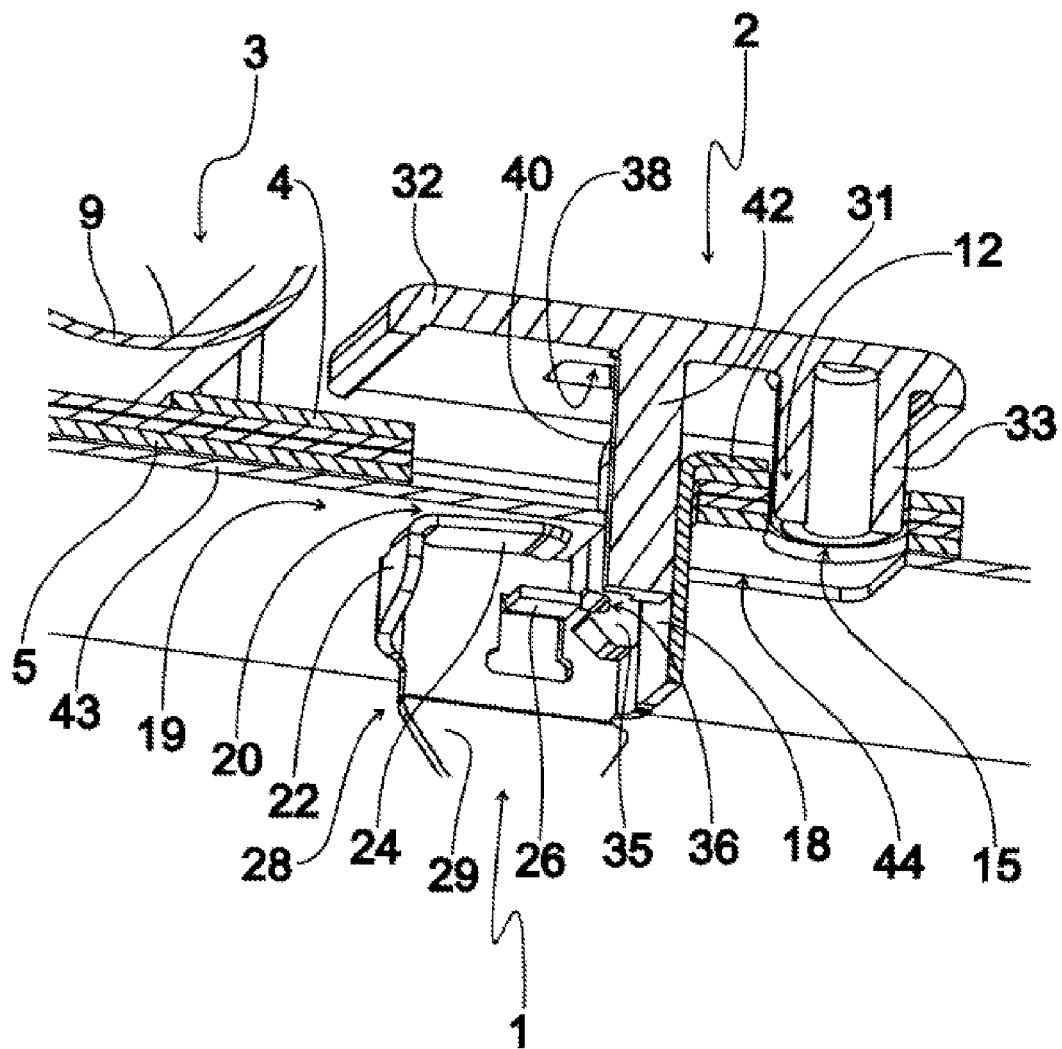
FIG. 5 is a cut-away perspective view of the exemplary embodiment depicted in FIG. 4, with the bracket part in an arrangement in which it is pushed onto the carrier part.

FIG. 5 is a perspective cut-away view of the exemplary inventive fastening arrangement depicted in FIGS. 1 and 4 and the exemplary inventive device depicted in FIGS. 1 to 4 in an arrangement that is shifted, compared to the arrangement of FIG. 4, in relation to the carrier part 43, with the result that the edge region of carrier part 43 adjacent carrier-part opening 44 is disposed in the receiving slots 20, 21, whereupon, by suitable dimensioning of the receiving slots 20, 21 in the depth direction and due to the arrangement of the locking arms 34, 35, when the edge region of carrier part 43 comes into abutment with the closed end regions of receiving slots 20, 21 adjacent the back wall 18 it bears against the locking arms 34, 35, moving them far enough toward the back wall 18 of bracket part 1 to cancel the engagement between the locking tongues 26, 27 and the locking-tongue grooves 36, 37. It can further be appreciated from FIG. 5 that in this arrangement of bracket part 1, in which it is pushed onto carrier part 43, the securing pin 33 of securing part 2 is disposed in prolongation of carrier-part opening 44, which is now free again.

It is also apparent from FIG. 5 that each leg 24, 25 bears against the side of carrier part 43 that faces toward foot region 28 of bracket part 1, and, by the pressure force exerted, secures the exemplary inventive fastening arrangement and the exemplary inventive device against accidentally being shifted back into the arrangement of FIG. 5.

Figure 6:
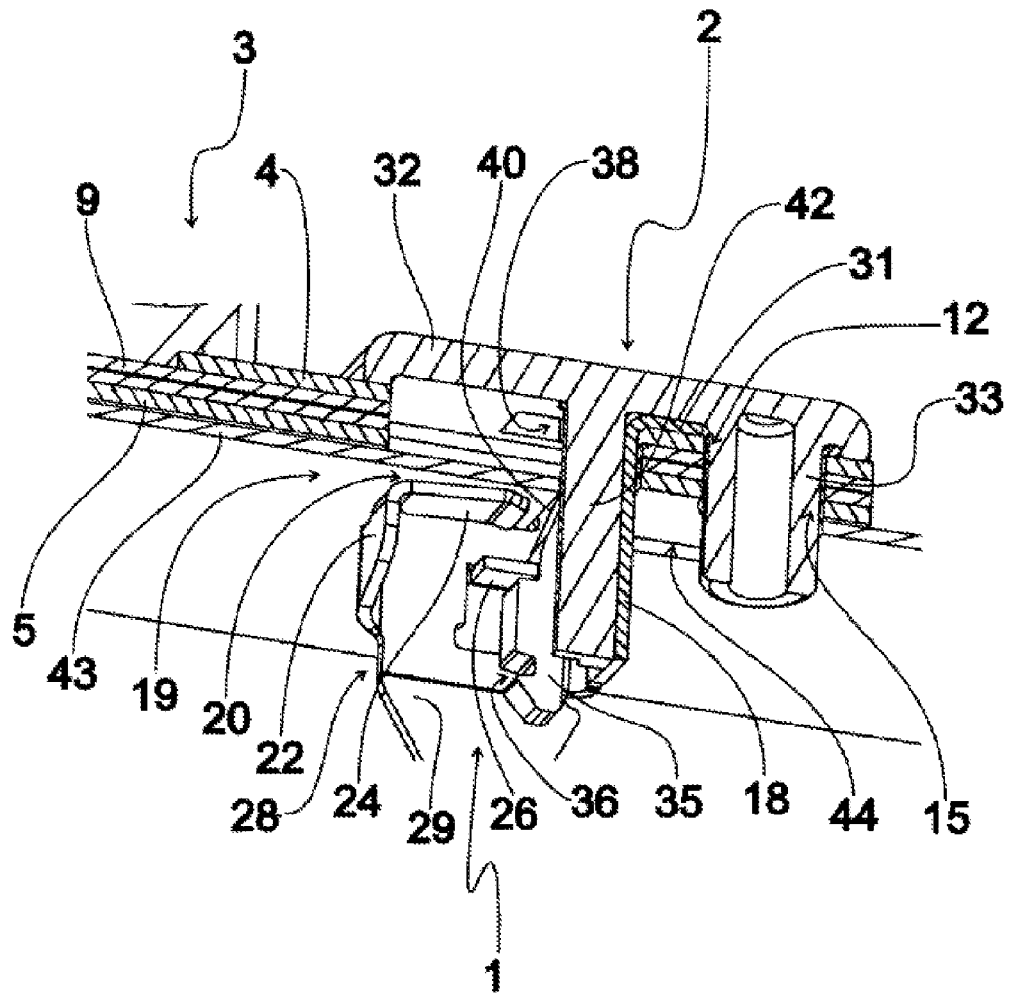
FIG. 6 shows the arrangement depicted in FIGS. 4 and 5 with the securing part in a pushed-in, final mounting position.

FIG. 6 is a perspective, partially cut-away view of the arrangement of the carrier part 43 and of the exemplary inventive fastening arrangement and the exemplary inventive device according to FIGS. 4 and 5 with the securing part 2 in a final mounting position, in which it pushed in compared to the pre-mounting position depicted in FIGS. 1 to 5. The final mounting position can be assumed, starting from the arrangement of FIG. 5, by applying a pressure force in the longitudinal direction of bracket part 1 to the top plate 32 of securing part 2, the locking arms 34, 35 now being free, thereby shifting securing part 2 toward bracket part 1 until top plate 32 lies on the top portion 4 of airbag receptacle 3. In the final mounting position, the locking tongues 26, 27 are engaged behind rear-engagement step 41 of locking arms 34, 35 and fix the securing part 2 in the pushed-in, final mounting position.

Securing pin 33 has also passed through carrier-part opening 44 and bears against the opposite edge region of carrier-part opening 44 from the edge region that is inserted in the receiving slots 20, 21, thereby securing the inventive device and the inventive fastening arrangement on the carrier part 43, since displacement of the fastening arrangement or the device out of the arrangement according to FIG. 6 into the arrangement according to FIG. 4 or FIG. 5 is henceforth blocked by the securing pin 33, in the pushed-in final mounting position of securing part 2.

To release the engagement between the locking tongues 26, 27 of bracket part 1 and the rear-engagement step 41 formed on the locking arms 34, 35 of securing part 2, a tool, for example in the form of a two-pronged fork or two pin-like objects, can be passed through the release openings 38 provided in the top plate 32 of securing part 2, which tool, after sliding up the releasing ramps 40 of locking arms 34, 35, moves the locking arms 34, 35 toward the back wall 18 of bracket part 1 and, once the rear engagement is released, allows securing part 2 to move back into the raised pre-mounting position. In the pre-mounting position, securing pin 33 has come back out of carrier-part opening 44, and the exemplary inventive fastening arrangement and the exemplary inventive device can again be shifted back into the arrangement according to FIG. 4, substantially resistance-free sliding being ensured by the bend formed in the free end of each of the spring legs 24, 25, and can be removed from the carrier part 43.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for fastening an add-on part to a carrier part, said device comprising:
   a bracket part adapted to fasten the carrier part to the add-on part, said bracket part insertable in an opening formed in the carrier part, and including a carrier part receptacle for receiving an edge region of said carrier part adjacent the opening;
   a securing part connected to said bracket part, said securing part displaceable relative to said bracket part and including a securing pin which, upon insertion of the edge region of the carrier part into said carrier part receptacle, is disposed in the opening to affix said bracket part to the carrier part;
   said bracket part including two mutually opposite side walls, each having a head region facing toward said securing part, said carrier part receptacles respectively formed in said head regions as receiving slots open to edge faces of said side walls, each said side wall including a laterally outwardly protruding side tab oriented perpendicular to the respective said side wall, each said side tab formed at an end of said side wall that is disposed within said head region; and
   said head region including spring legs oriented at right angles to said side walls and obliquely to said receiving slots.

2. The device of claim 1, wherein said bracket part includes a back wall disposed between said side walls, said back wall including an abutment tab oriented perpendicular to said back wall and terminating at a free end disposed proximate said securing pin.

3. The device of claim 1, wherein said securing pin is formed on a top plate of said securing part.

4. The device of claim 1, further comprising an add-on part connected to said bracket part by a latching assembly.

5. A device for fastening an add-on part to a carrier part, said device comprising:
   a bracket part adapted to fasten the carrier part to the add-on part, said bracket part insertable in an opening formed in the carrier part, and including a carrier part receptacle for receiving an edge region of said carrier part adjacent the opening;
   a securing part connected to said bracket part, said securing part displaceable relative to said bracket part and including a securing pin which, upon insertion of the edge region of the carrier part into said carrier part receptacle, is disposed in the opening to affix said bracket part to the carrier part;
   wherein said securing pin is formed on a top plate of said securing part; and
   wherein said securing part includes at least one locking arm formed on said top plate, said locking arm cooperating with a locking tongue on said bracket part and fixing said securing part in a raised pre-mounting position and in a pushed-in final mounting position.

6. The device of claim 5, wherein said top plate includes at least one release opening through which a tool may be passed for engaging said at least one locking arm to release an engagement of said at least one locking arm with a respective said locking tongue.

7. The device of claim 5, wherein said bracket part includes two mutually opposite side walls, each having a head region facing toward said securing part, said carrier part receptacles respectively formed in said head regions as receiving slots open to edge faces of said side walls.

8. The device of claim 7, wherein each said side wall includes a laterally outwardly protruding side tab oriented perpendicular to the respective said side wall, each said side tab formed at an end of said side wall that is disposed within said head region.

9. The device of claim 7, wherein said bracket part includes a back wall disposed between said side walls, said back wall including an abutment tab oriented perpendicular to said back wall and terminating at a free end disposed proximate said securing pin.

10. The device of claim 5, wherein said securing pin is formed on a top plate of said securing part.

11. The device of claim 5, further comprising an add-on part connected to said bracket part by a latching assembly.

* * * * *